United States Patent [19]

Tanaka

[11] Patent Number: 4,657,451
[45] Date of Patent: Apr. 14, 1987

[54] CONTACT DETECTOR FOR A MACHINE TOOL

[75] Inventor: Yuzuru Tanaka, Osaka, Japan

[73] Assignee: Daishowa Seiki Co., Ltd., Osaka, Japan

[21] Appl. No.: 774,758

[22] Filed: Sep. 11, 1985

[30] Foreign Application Priority Data

Mar. 15, 1985 [JP] Japan .................. 60-53010

[51] Int. Cl.$^4$ .............................................. B23B 39/04
[52] U.S. Cl. ................................ 409/186; 324/207; 324/226; 408/6; 408/13
[58] Field of Search .............. 408/2, 6, 8, 10, 11, 408/13; 409/134, 135, 136; 324/207, 208, 226, 239, 253, 260, 261, 233; 33/561; 340/644

[56] References Cited

U.S. PATENT DOCUMENTS

| | | | |
|---|---|---|---|
| 3,777,255 | 12/1973 | Young et al. | 324/207 |
| 4,000,448 | 12/1976 | Shum et al. | 324/207 X |
| 4,203,691 | 5/1980 | Nishimura et al. | 408/8 |
| 4,329,771 | 5/1982 | Eto et al. | 408/8 X |
| 4,396,322 | 8/1983 | Nomura et al. | 408/6 X |
| 4,401,945 | 8/1983 | Juengel | 324/207 |
| 4,408,933 | 10/1983 | Tomita et al. | 408/8 |
| 4,440,530 | 4/1984 | Yamakage | 408/13 X |

Primary Examiner—Gil Weidenfeld
Assistant Examiner—Glenn L. Webb
Attorney, Agent, or Firm—Koda and Androlia

[57] ABSTRACT

A contact detecting system for detecting the contact of a tool element, supported by a main shaft of a machine, with a workpiece comprises exciting and detecting coil assemblies, an electric power source for supplying a high frequency electric current to the exciting coil assembly to cause the latter to produce an induction current flowing in a loop circuit constituted by the machine shaft, the tool element and a framework of the machine, and a detector unit for generating a detection signal indicative of the actual contact of the tool element with the workpiece when the detector unit has detected the presence of a current component, which has resulted from the induction current generated by the exciting coil assembly, in the output signal from the detecting coil assembly.

4 Claims, 7 Drawing Figures

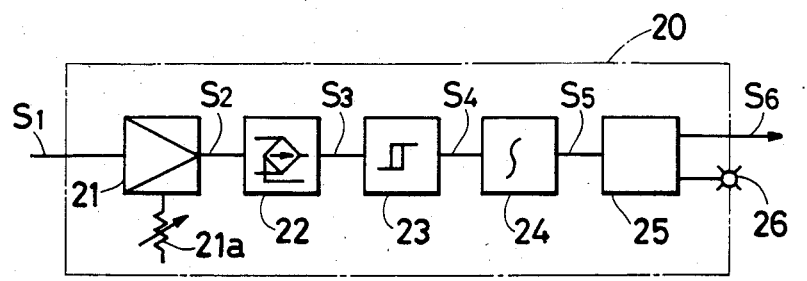
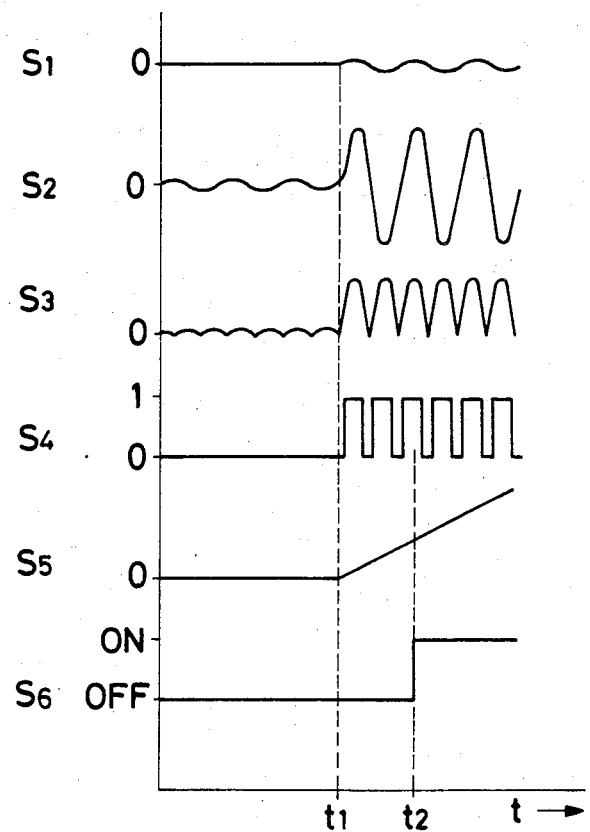

CONTACT DETECTOR FOR A MACHINE TOOL

BACKGROUND OF THE INVENTION

The present invention generally relates to a contact detector for a machine tool and, more particularly, to a contact detector for detecting the contact between a motor-driven tool and a workpiece to be machined thereby for issuing an electric signal indicative of the start of machining performed by the machine tool on the workpiece.

In the determination of the start of contact between a workpiece to be machined and a motor-driven tool for the purpose of initiating the machining operation, it is well known to make use of an electromagnetic phenomenon created upon contact of the motor-driven tool with the workpiece to be machined, and so is a device for detecting the contact therebetween. By way of example, the Japanese Patent Publication No. 48-48861, published in 1973, discloses a system wherein a source of alternating current is connected between an upper end of a main shaft of the machine and a bed for supporting the workpiece and a detecting coil secured to the main shaft detects an alternating current flowing between the workpiece and the workpiece on the bed upon contact of the tool and the workpiece. According to the system disclosed in this publication, the electric current constantly flows through the machine framework at all times, and accordingly, this tends to constitute a major cause of the increased consumption of electric power and the increased noises.

According to the Japanese Patent Publication No. 58-41983, published in 1983, there is disclosed a detecting system for detecting the contact of the motor-driven tool with the workpiece by the utilization of changes in impedance of the coil, secured to the main shaft of the machine tool, which occur upon contact of the tool with the workpiece. The system disclosed in this second-mentioned publication is advantageous in that an unnecessary consumption of electric power can be minimized. However, it has been found that, since the magnitude of change in impedance of the coil is very small, the signal-to-noise (S/N) ratio is unsatisfactory and the machine operation tends to lack stability.

In addition to the respective problems inherent in these prior art detecting systems, the both have another problem common to them. Since the motor-driven tool used in the machine is driven at a high speed, an oil film is developed in bearings supporting the motor-driven tool, which oil film oftentimes act as an electric insulator insulating the motor-driven tool from the machine framework. Accordingly, in any one of these prior art detecting systems discussed above, the provision of, for example, contact brushes or the like is required to keep the motor-driven tool in electric contact with the machine framework during the high speed rotation of the motor-driven tool. This means that in these prior art detecting systems, the time-consuming and cost-incurring procedures are required to attach and maintain the constact brushes or the like.

SUMMARY OF THE INVENTION

Accordingly, the present invention has been developed with a view to substantially eliminating the above described disadvantages and inconveniences inherent in the prior art detecting systems and has for its essential object to provide an improved contact detecting system capable of assuredly detecting the contact between the workpiece and the motor-driven tool without relying the use of contact brushes.

BRIEF DESCRIPTION OF THE DRAWINGS

This and other objects and features of the present invention will become clear from the subsequent detailed description of preferred embodiments thereof made with reference to the accompanying drawings, in which:

FIG. 4 is a circuit block diagram of the contact detecting system according to the present invention; and FIG. 5 is a diagram showing various waveforms of signals appearing in the circuit shown in FIG. 4.

DETAILED DESCRIPTION OF THE EMBODIMENT

Figure 1:
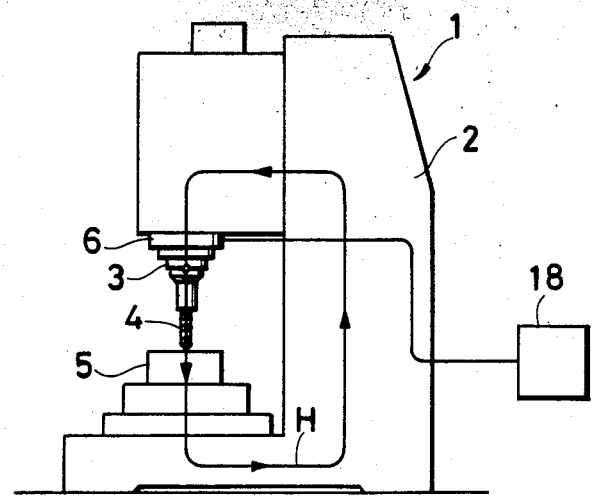
FIG. 1 is a schematic front elevational view of a machine tool having incorporated therein a contact detecting system according to the present invention.

Referring first to FIG. 1, a machine 1 shown therein has a framework 2 carrying a main shaft 3 for movement in a direction close towards and away from a workpiece 5 which is mounted on a machine bench. A machining tool element 4 is chucked, or supported in any manner, by the main shaft 3 for movement together therewith, which tool element 4 is adapted to perform an actual machining operation such as, for example, cutting or drilling, on the workpiece 5.

The contact detector embodying the present invention comprises an annular sensor unit 6, mounted on the machine 1 so as to surround the main shaft 3 as will be detailed later, and a control unit 18 as will be also described later.

Figure 2:
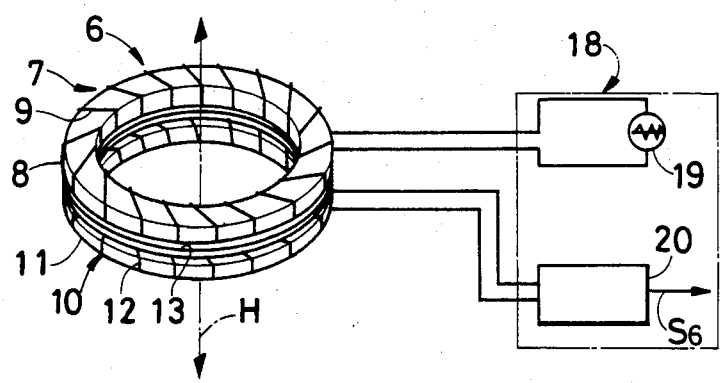
FIG. 2 is a perspective view of a sensor unit, shown together with a circuit block diagram, of the contact detecting device according to the present invention.
Figure 3A:
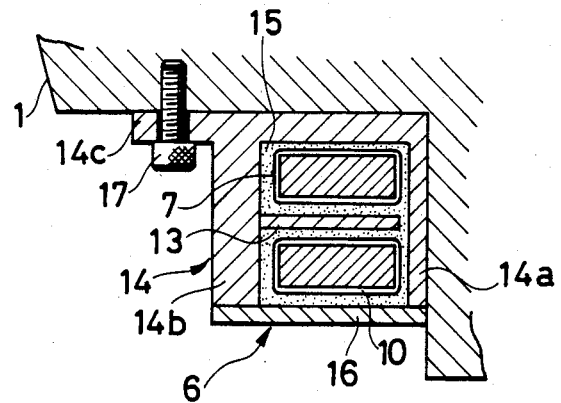
FIG. 3A is a sectional view of the sensor unit shown in FIG. 2.

Referring now to FIG. 2, the sensor unit 6 comprises an exciting coil assembly 7 and a detecting coil assembly 10, each of said coil assemblies 7 and 10 being constituted by a respective ring-shaped core 8 or 11 made of a magnetizeable material such as, for example, ferrite, and having a coil 9 or 12 turned around the respective ring-shaped core 8 or 11. The exciting coil assembly 7 and the detecting coil assembly 10 are coaxially arranged one above the other with an annular shielding plate 13 positioned therebetween, said annular shielding plate 13 being made of a magnetizeable material such as, for example, iron. More specifically, as best shown in FIG. 3A, all of the exciting and detecting coil assemblies 7 and 10 and the shielding plate 13 are encapsulated within a generally U-sectioned annular casing 14 made of a metallic material such as, for example, aluminum. This casing 14 is, after the assemblies 7 and 10 and the shielding plate 13 have been accommodated therein in a predetermined arrangement described above, filled with a synthetic resin 15, the annular opening of the casing 14 being, after the solidification of the synthetic resin 15 injected into the casing 14, closed by an annular cover plate 16. It is to be noted that, in the fabricated condition, both of the exciting and detecting coil assemblies 7 and 10 are electrically insulated from the casing 14 in the presence of the synthetic resin 15 whereas the annular shielding plate 13 is so sized and so positioned as to electrically connect the radially opposite wall portions 14a and 14b of the casing 14 together through such shielding plate 13. So far shown, the shielding plate 13 has its outer peripheral edge held in contact with the outer wall portion 14b of the casing 14.

The casing 14 has a radially outwardly protruding flange 14c integrally formed therewith, through which flange 14c the sensor unit 6 is secured rigidly by means of a plurality of set bolts 17 to the machine 1 so as to surround the main shaft 3.

So far shown in FIG. 3A, the sensor unit 6 is of a construction wherein the exciting and detecting coil assemblies 7 and 10 are positioned one above the other in a direction coaxially of the main shaft 3. However, the sensor unit 6 utilizeable in the practice of the present invention may not be always limited to the structure shown in FIGS. 2 and 3A, but it may be modified as shown in any one of FIGS. 3B and 3C. More specifically, in the modification shown in FIG. 3B, the exciting and detecting coil assemblies 7 and 10 are arranged one inside the other in coaxial relation to the main shaft 3 and, for this purpose, the exciting coil assembly 7 is shown as having an outer diameter smaller than the inner diameter of the detecting coil assembly 10. Instead thereof, the exciting coil assembly 7 may have an inner diameter greater than the outer diameter of the detecting coil assembly 10, in which case the exciting coil assembly 7 is arranged radially outwardly of the detecting coil assembly 10.

Referring still to FIG. 2, the control unit 18 comprises an electric power source 19 from which a high frequency current is supplied to the exciting coil assembly 7, and a detecting circuitry 20 for processing an output signal derived from the detecting coil assembly 10 tp produce a detection signal indicative of the contact of the tool element 4 with the workpiece. This control unit 18 including the electric power source 19 and the detecting circuitry 20 is fabricated in a single control module which is in turn incorporated in a control console (not shown) of the machine 1. The electric power source 19 is constituted by an oscillating circuit capable of oscillating at a frequency within the range of several KHz to a few hundred KHz, a power amplifying circuit and others and is of a design having its operating frequency and an output power both adjustable.

The details of the detecting circuitry 20 are best shown in FIG. 4. As shown therein, the detecting circuitry 20 comprises an amplifier 21 having its amplification degree adjustable by an adjustment 21a, a wave detector 22, a wave shaping circuit 23, an integrator 24, an output circuit 25 and an indicator lamp 26. This detecting circuitry 20 is so constructed as to operate in such a manner that, after the output signal from the detecting coil assembly 10 has been amplified and the waveform of the amplified output signal has subsequently been detected, the signal of a level exceeding a predetermined value can be converted into a pulse of predetermined waveform and, in the event that a predetermined number of, for example, three, pulses are supplied continuously, a detection signal S6 can be generated and, at the same time, the indicator lamp 26 can be turned on, as can be readily understood from the waveforms shown in FIG. 5. It is to be noted that reference characters S1, S2, . . . S5 and S6 shown in FIG. 5 represent respective ouptut signals S1, S2, . . . S5 and S6 shown in FIG. 4. In the diagram of the waveforms of FIG. 5, $t_1$ represents the time at which the tool element 4 contacts the workpiece 5 and $t_2$ represents the timing at which the detection signal S6 is generated from the output circuit 25.

More specifically, when the high frequency electric current is supplied from the power source 19 to the exciting coil assembly 7, a high frequency electromagnetic field is produced in the core 10. When the tool element 4 is brought into contact with the workpiece 5 as a result of the descending motion of the main shaft 3, a high frequency electric current H is induced by the high frequency electromagnetic field flowing in a loop circuit including the framework 2, the main shaft 3, the tool element 4 and the workpiece 5 as shown in FIG. 1. As a result of the flow of the high frequency electric current H, a high frequency electromagnetic field is developed in the core 11 of the detecting coil assembly 10 with the consequence that a high frequency electric current is induced in the coil 12 of the detecting coil assembly 10. The high frequency electric current induced in the coil 12 of the detecting coil assembly 10 is the output signal S1 emerging from the sensor unit 6. The detection signal S6 indicative of the start of contact of the tool element 4 with the workpiece 5 is obtained from the detecting circuitry 20 so designed as to process the output signal S6 to produce such detection signal S6.

The integrator 24 is utilized to avoid any possible erroneous operation resulting from one-shot noise. However, the use of the integrator 24 results in a delay in response represented by the difference $(t_2 - t_1)$, the value of which is practically insignificant because the frequency of the power source 19 is very high. With respect to the insulation established by the formation of the oil film in the bearings, the static capacitance of the oil film in the bearing acts as a reactance of definite value to such a high frequency as used in the present invention thereby to produce the high frequency electric current H which is detected in the practice of the present invention. Moreover, the loop circuit through which the high frequency electric current H flows can be considered as a sort of resonator circuit and, therefore, it is possible to obtain the high frequency electric current H of relatively high value by adjusting the oscillating frequency of the power source 19.

According to the foregoing embodiment of the present invention, when and so long as no contact take place between the tool element 4 and the workpiece 5, no high frequency electric current H flow in the machine 1 and, therefore, no unreasonable increase in consumption of the electric power occur in the machine system as a whole. On the other hand, in the event that the contact between the tool element 4 and the workpiece 5 takes place, the high frequency electric current H flows in the machine even during the high speed rotation of the main shaft 3, the flow of the high frequency electric current H being detected by the detecting coil assembly 10 on a non-contact scheme wherefore the detection signal can be obtained from the detecting circuitry 20 steadily and at good S/N ratio.

Moreover, since the exciting and detecting coil assemblies 7 and 10 are both accommodated and firmly held within the single casing 14, the sensor unit 6 can readily be fitted to the machine 1 with no difficulty and can also be replaced with another one simply and easily if desired. The provision of the annular shielding plate 13 makes it possible to minimize or substantially eliminate the possibility of the detecting coil assembly 10 generating its output signal prematurely under the influence of a leakage of electromagnetic field from the exciting coil assembly 7. However, if no possibility of the electromagnetic field leaking from the exciting coil assembly 7 exist, or if means is provided for counteracting a component contained in the output signal from the detecting coil assembly which would results from the electromagnetic field leaking from the exciting coil assembly 7, the shielding plate 13 need not be always required.

Figure 3B:
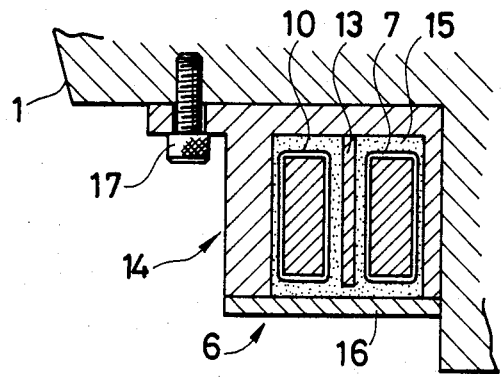
FIGS. 3B and 3C are views similar to FIG. 3A showing respective modified forms of the sensor unit.
Figure 3C:
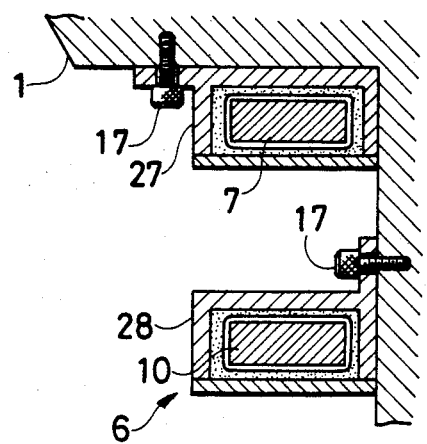

So far shown in FIGS. 3A and 3B, both of the exciting and detecting coil assemblies 7 and 10 have been described and shown as accommodated within the single casing 14. However, as shown in FIG. 3C, the exciting and detecting coil assemblies 7 and 10 may be placed in respective casings 27 and 28 which are in turn secured to the machine 1 so as to surround the main shaft 3 in such a separated relationship that the detecting coil assembly 10 will not be adversely affected by the electromagnetic field leaking from the exciting coil assembly 7.

The detecting circuitry 20 may not be always of such a construction as shown in FIG. 4. By way of example, the integrator 24 may be constituted by a synchronizing counter. The detecting circuitry 20 may have a noise reduction filter inserted therein. Moreover, the detecting circuitry 20 may be so designed that signals other than the signal derived by the high frequency electric current H can be counteracted by comparing them with the signal fed from the power source 19 or that the contact of the tool element 4 with the workpiece 5 can be detected by detecting changes in phase of the detection signal.

Furthermore, the sensor unit 6 may be so constructed as to have two exciting coil assemblies and one detecting coil assembly sandwiched between the two exciting coil assemblies, or two detecting coil assemblies and one exciting coil assembly sandwiched between the two detecting coil assemblies, in which case not only can the leakage of electromagnetic field be minimized with the consequently improved detecting sensitivity, but the S/N ratio can also be improved.

The casing 14 may not have the fitting flange 14c formed integrally therewith, in which case a separate mounting member made of either synthetic resin or metal may be used to secure the sensor unit 6 to the machine 1. Where the static capacitance of the bearing used in the main shaft 3 of the machine 1 is short of the requirement or unstable, an annular counterplate may be provided spacedly between a fixed portion and a rotatable portion of the bearing to make the bearing have a static capacitance. A reliable detection of the contact of the tool element with the workpiece can also be accomplished if a lubricating oil used in the bearing is employed in the form of an oil having a high specific dielectric constant or having an electro-conductivity.

Examples of the machine 1 to which the detecting system of the present invention is applicable are to be understood as including a machine tool and any other machine wherein the main shaft 3 is fixed while the workpiece 5 is supported for movement together with the bench in a direction close towards and away from the fixed main shaft or wherein the main shaft 3 is non-rotatable. In addition, it is to be understood as a routine expedient to those skilled in the art to secure one or both of the exciting and detecting coil assemblies to a portion of the machine 1 adjacent either the workpiece 5 or the framework 2.

Although the present invention has fully been described in connection with the preferred embodiments thereof with reference to those skilled in the art, such changes and modifications as falling within the scope of the present invention as defined by the appended claims are to be understood as included within the scope of the present invention.

What is claimed is:

1. A contact detecting system for detecting the contact of a tool element with a workpiece, which system comprises:

exciting and detecting coil assemblies mounted on a main shaft of a machine while said main shaft loosely extends through said exciting and detecting coil assemblies, said main shaft of the machine being adapted to support the tool element generally in face-to-face relation with the workpiece to be machined by said tool element, said exciting and detecting coil assemblies each further comprising a separate ring-shaped core made of a magnetizable material and a separate winding evenly coiled around the core and said coil of said exciting coil assembly and said coil of said detecting coil assembly being substantially electromagnetically isolated from each other when said tool element is not in contact with said workpiece;

an electric power source for providing the exciting coil assembly with a high frequency electric current;

said exciting coil assembly generating an induction current when an actual contact between the tool element and workpiece takes place, said induction current so generated flowing in a loop circuit constituted by the main shaft, the tool element and a framework of the machine, said detecting coil assembly generating an output signal upon the generation of the induction current; and a detector unit for generating a detection signal indicative of the actual contact of the tool element with the workpiece when said detector unit has detected the presence in the output signal from the detecting coil assembly of a current component which has resulted from the induction current generated in the exciting coil assembly.

2. A system as claimed in claim 1, wherein said exciting and detecting coil assemblies are arranged adjacent to each other with a ring-shaped shielding plate positioned between said exciting and detecting coil assemblies, said shielding plate being made of magnetizeable material.

3. A system as claimed in claim 2, further comprising an annular casing having a generally U-shaped cross-sectional representation, said exciting and detecting coil assemblies being accommodated, together with the shielding plate, within a generally U-sectioned space in the casing, all of said exciting and detecting coil assemblies and said shielding plate being embedded in a synthetic resin filler poured and solidified in the U-sectioned space of the casing.

4. A system as claimed in claim 1, wherein said exciting and detecting coil assemblies are spaced from each other a distance required to prevent the detecting coil assembly from being adversely affected by an electromagnetic field leaking from the exciting coil assembly.

* * * * *